United States Patent [19]

Johnson, deceased et al.

[11] 4,159,655

[45] Jul. 3, 1979

[54] ADJUSTABLE ECCENTRIC

[75] Inventors: Arthur R. Johnson, deceased, late of Hartford, Conn.; by Paul A. Hudon, administrator; Martin Kesten, both of West Hartford, Conn.

[73] Assignee: Preston Engravers, Inc., Windsor, Conn.

[21] Appl. No.: 865,716

[22] Filed: Dec. 29, 1977

[51] Int. Cl.$^2$ .............................................. G05G 1/12
[52] U.S. Cl. .................................................. 74/571 L
[58] Field of Search ............ 74/571 L, 571 R, 571 M, 74/117, 835, 836

[56] References Cited

U.S. PATENT DOCUMENTS

| | | | |
|---|---|---|---|
| 598,836 | 2/1898 | Anderson | 74/571 R |
| 1,565,264 | 12/1925 | Dubi | 74/571 M |
| 1,903,932 | 4/1933 | Mueller | 74/571 R |
| 2,270,816 | 1/1942 | Zonis | 74/571 L |
| 2,453,072 | 11/1948 | Johnson | 74/571 M |
| 2,594,836 | 4/1952 | Wunderlich et al. | 74/571 L |
| 2,790,331 | 4/1957 | Pinkvoss | 74/571 R |
| 3,374,683 | 3/1968 | Jesse | 74/571 R |

Primary Examiner—Kenneth J. Dorner

[57] ABSTRACT

An adjustable eccentric assembly is mounted on a rotatable shaft and includes a first or drive collar having an arbor extending along the shaft and a second or guide collar mounted at the end of the arbor spaced from the drive collar. The drive collars have respective guide surfaces extending parallel to the axis of rotation of the shaft and a guide track is formed in the guide collar guide surface extending perpendicularly of the axis of rotation. A hub member is supported between the guide and drive collars and engages the guide track. Adjusting means serve to shift the hub member radially relative to the rotatable shaft to adjust the eccentricity of its rotation about the shaft. A throw member having a projecting link may be rotatably mounted on the hub member so that the eccentric rotation of the hub member imparts a reciprocating motion to the throw link. Locking means enable the adjustable eccentric assembly to be mounted in any rotational relation to the rotatable shaft so as to control the timing of the eccentric throw.

17 Claims, 16 Drawing Figures

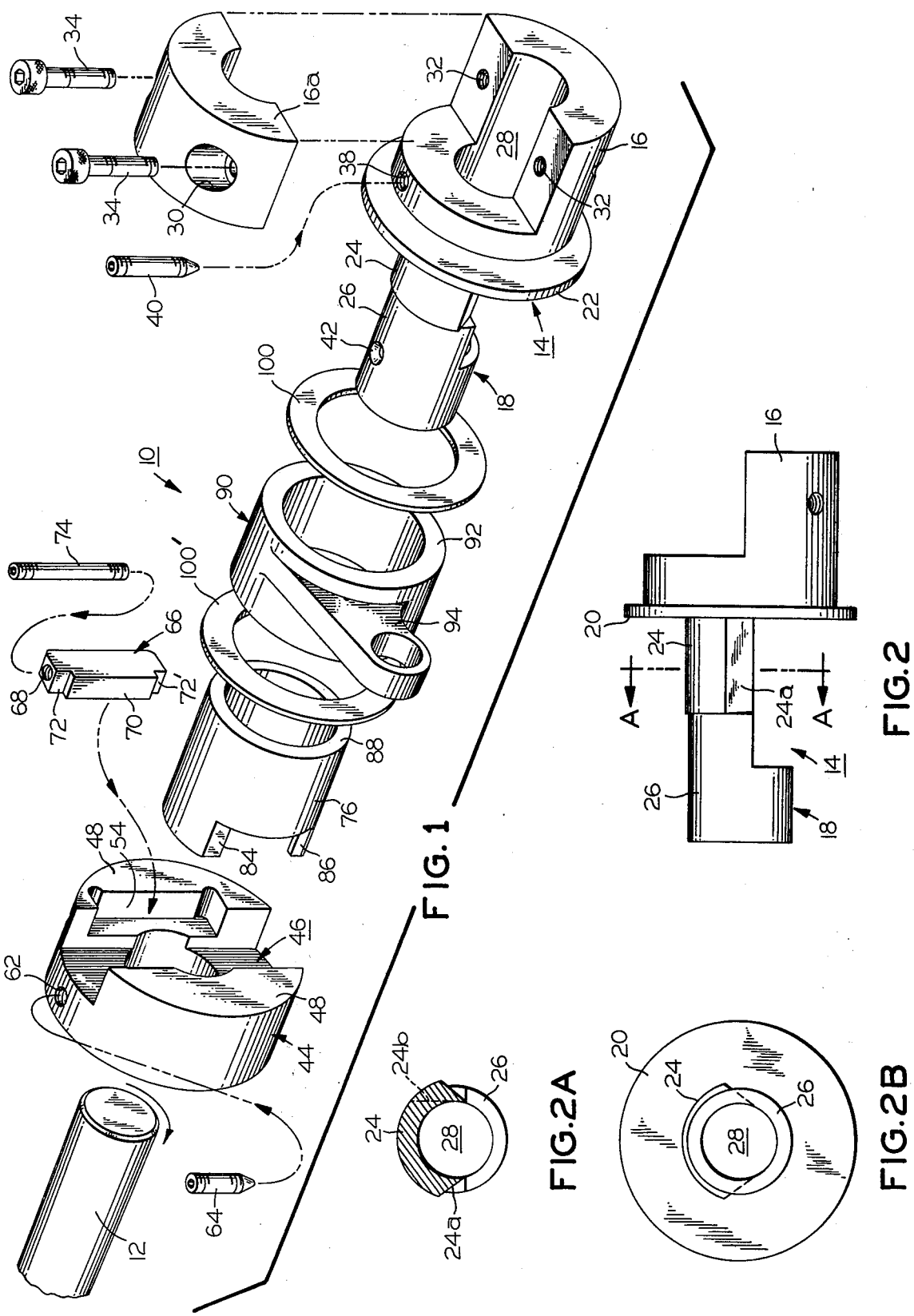

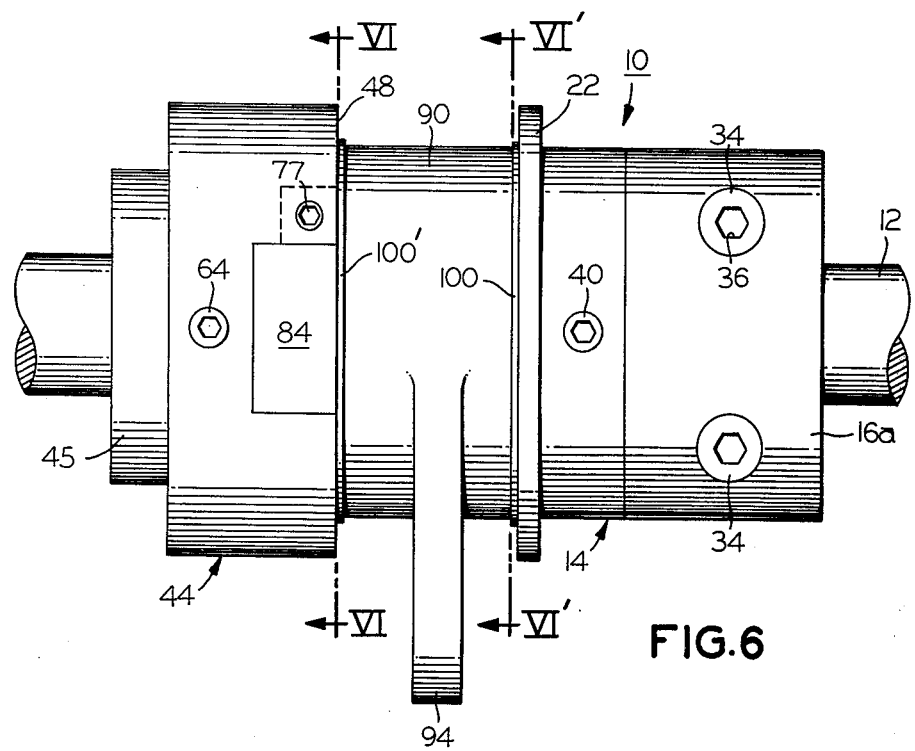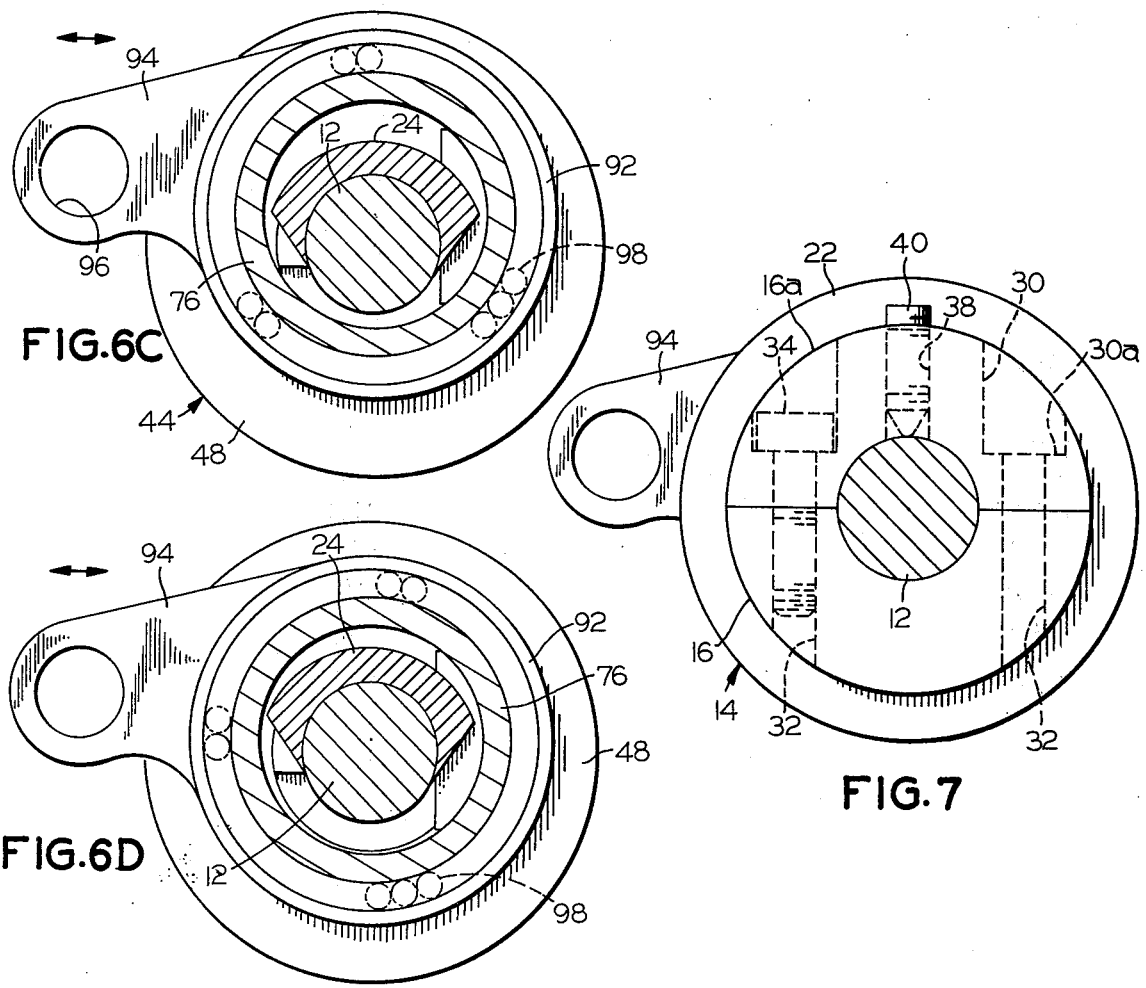

ADJUSTABLE ECCENTRIC

BACKGROUND OF THE INVENTION

The present invention is concerned with an adjustable eccentric assembly, more particularly with an adjustable eccentric assembly adapted to be mounted on a rotatable shaft and capable of having both its timing and degree of eccentricity adjusted.

Various arrangements for permitting adjustment of the degree of eccentricity are known in the art and these usually are somewhat complex and therefore relatively expensive. Some prior art arrangements for providing an adjustable eccentric suffer from the shortcoming that the various parts are held in place by friction or spring-loaded detent means or have separate components individually locked to the rotatable shaft. Such arrangements are subject to misalignment of the parts by shifting of the individual parts under the stresses of operation.

It is accordingly an object of the present invention to provide an adjustable eccentric of simple, efficient and novel design in which the various components are interlocked in a compact unit which is readily adjustable to adjust the degree of eccentricity, i.e., the magnitude of the eccentric "throw."

It is another object of the present invention to provide a novel adjustable eccentric assembly in which not only the degree of eccentricity or throw is selectively adjustable, but also the timing of the throw relative to rotation of the shaft member on which the adjustable eccentric assembly is mounted is adjustable in a simple and efficient manner.

Other objectives and advantages of the present invention will be apparent from the following description.

SUMMARY OF THE INVENTION

In accordance with the present invention there is provided, in an adjustable eccentric assembly, the following combination of parts. A first collar means having mounting means adapted to non-rotatably mount the first collar means to a rotatable member for rotation therewith about an axis of rotation. The first collar means has a first guide surface extending perpendicularly of the axis of rotation. A second collar means having mounting means adapted to non-rotatably mount the second collar means to the associated rotatable member for rotation with said first collar means about the axis of rotation is also provided. The second collar means has a second guide surface extending parallel to the first guide surface and being spaced apart therefrom along the common axis of rotation. Also included is a hub member non-rotatably supported between the first and second collar means for rotation therewith, the hub member having a longitudinal axis disposed parallel to the common axis of rotation and opposite ends extending perpendicularly of its longitudinal axis and slidably seated on, respectively, the first and second guide surfaces. The hub member has an axially extending interior passageway. An adjusting means is operatively connected to the hub member and to at least one of the collar means for radially moving the hub member along the guide surfaces to any one of selected positions relative to the collar means to displace the longitudinal axis of the hub member radially relative to the common axis of rotation of the collar means. This results in adjustment of the eccentricity of rotation of the hub member about the common axis of rotation, the hub member being guided by the guide surfaces to maintain the longitudinal axis of the hub member parallel to the common axis of rotation. The interior passageway of the hub member is sized and configured to provide clearance for such radial displacement of the hub member.

Certain objects of the invention are attained when the hub member has a longitudinally extending cylindrical outer bearing surface, and the assembly further includes a throw member mounted on the bearing surface for rotation of the hub member relative to the throw member, the throw member including a throw link projecting outwardly therefrom transversely of the common axis of rotation.

Other objects are attained when the first and second collar means each has an axially extending opening therein, the axially extending openings are axially aligned with the axially extending interior passageway of the hub member, and each of the openings and the interior passageway is adapted to receive the associated rotatable member therein.

In accordance with certain aspects of the invention, the first and second collar means are adapted to be initially rotatable about the associated shaft member and the mounting means includes locking means adapted to non-rotatably lock the first and second collar means in a selected rotational orientation relative to the associated rotatable shaft.

An assembly in accordance with the invention may further include an arbor received within and extending axially through the hub member interior passageway between the first and second collar means, the arbor being non-rotatably affixed to each of the first and second collar means for rotation therewith and being adapted to be seated upon the associated non-rotatable member.

In one aspect of the invention, the arbor is affixed at one end thereof to the first collar means and has a collar seating member at its opposite end, the second collar means being non-rotatably seated on said collar seating means. Further a guide track may be formed in at least one of the guide surfaces and be adapted to receive one end of the hub member therein, the guide track extending perpendicularly of the common axis of rotation. Adjusting means may also be disposed in the second collar means adjacent the guide track, the adjusting means including an engagement element thereon adapted to engage the hub member and displacement means adapted to move the engagement element and thereby displace the hub member radially relative to the common axis of rotation.

Generally, the first and second collar means may have axially aligned bores extending axially therethrough, the first collar means having a generally cylindrically configured mounting portion and the second collar means having a generally cylindrical configuration.

BRIEF DESCRIPTION OF THE DRAWINGS

FIG. 1 is a perspective exploded view of one embodiment of an eccentric assembly in accordance with the present invention;

FIG. 2 is a side view in elevation of the first or drive collar component of the assembly of FIG. 1;

FIG. 2A is a section view along line A-A of FIG. 2;

FIG. 2B is an end view of the left hand side (as viewed in FIG. 2) of the component of FIG. 2;

FIG. 6 is a top view of the assembled eccentric assembly of FIG. 1;

FIG. 6C is a section view taken along line VI'—VI' of FIG. 6;

FIG. 6D is a view corresponding to that of FIG. 6C but with hub member 76 in a relatively different position from that of FIG. 6C and with the throw arm 94 in a different phase of its movement from that illustrated in FIG. 6C; and FIG. 7 is an end view taken from the right hand side of FIG. 6 showing shaft 12 in section and some other parts in phantom outline.

DESCRIPTION OF THE PREFERRED EMBODIMENTS

Figure 3:
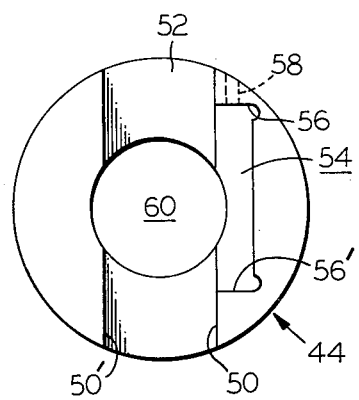
FIG. 3 is an end view in elevation of the inside face of the second or guide collar component of the assembly of FIG. 1.

FIG. 1 shows in exploded perspective view a preferred embodiment of an adjustable eccentric assembly in accordance with the invention. The assembly is generally indicated at 10 and is adapted to be mounted upon a rotatable shaft 12. The assembly includes a first, drive collar 14 having an annular mounting portion 16 and an arbor 18. As best seen in FIG. 2, arbor 18 extends outwardly from an annular shoulder or face 20 formed by an enlarged diameter portion 22 of drive collar 14.

Arbor 18 has a bridge portion 24 provided by a substantially semicircular segment of a cylinder, the axially extending edges of 24a of which are cut at an angle so that edges 24a taper to provide a V-shaped edge configuration. This is best seen in FIG. 2A which shows how edges 24a merge smoothly into the outer surface of shaft 12. A notch 24b of rectangular cross section (best seen in FIG. 2A and in FIG. 6A) is formed in bridge portion 24 for a purpose described below.

Arbor 18 terminates in a collar seat 26 which, as best seen in FIGS. 2 and 2B, has the form of a cylinder at its terminal end and is partially cut away for a portion of its length adjacent bridge portion 24 so that it has a generally U-shaped cross section at that portion.

A central bore 28 extends longitudinally through drive collar 14 and is dimensioned to snugly but slidably receive rotatable shaft 12 therein.

Mounting portion 16 has a semi-cylindrical clamping segment 16a cut therefrom. A pair of counter-sunk bolt holes 30 (only one of which is visible in FIG. 1) are drilled through clamping segment 16a and extend on opposite sides of and parallel to the cylindrical diameter of mounting portion 16 as best seen in FIG. 7. As also shown in FIG. 7 an annular shoulder 30a is provided in bolt holes 30 by the countersunk configuration.

A corresponding pair of bolt holes 32 are formed in mounting portion 16. Bolt holes 30 and 32 are adapted to receive a pair of bolts 34 therein to secure clamping segment 16a to mounting portion 16. As best seen in FIG. 7, the heads of bolts 34 are seated upon shoulders 30a when bolts 34 are fully tightened.

Only one of bolts 34 is shown, in phantom outline, in FIG. 7 to more clearly show shoulder 30a. While clamping segment 16a could be a separately formed part, it is convenient and economical to cut clamping portion 16a from mounting portion 16. The material removed by the thickness of the cutting tool in cutting clamping segment 16a provides sufficient play between clamping segment 16a and mounting portion 16 to insure that, as seen in FIG. 7, tightening of bolts 34 clamps clamping segment 16a and mounting portion 16 tightly to shaft 12. Bolts 34 serve as locking means to lock collar 14 to shaft 12. As best seen in FIG. 6, bolts 34 have hexagonal shaped openings 36 formed in the heads thereof to receive an allen wrench for turning bolts 34. Obviously, a slot or any other suitable formation may be formed in the heads of bolts 34 to receive any suitable turning tool such as a screwdriver.

Referring jointly to FIGS. 1 and 7, a radially extending threaded passageway 38 is formed in mounting portion 16 and extends therethrough to communicate with bore 28. A set screw 40 is adapted to be threadably engaged within passageway 38 and has a hexagonal formation formed in its head for engagement by an allen wrench or the like for turning thereof. As described below, set screw 40 is employed to lock drive collar 14 in any selected rotational position on shaft 12 and serves as the primary locking means.

A locking depression 42 is formed in collar seat 16 and is generally cone shaped, extending radially into collar seat 26 and lying in the same radial plane as threaded passageway 38. That is, the longitudinal center line of locking depression 42 lies in the same radial plane as the longitudinal axis of threaded passageway 38.

Figure 3A:
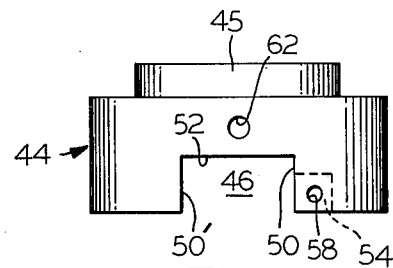
FIG. 3A is a top view of the collar of FIG. 3.

Referring jointly to FIGS. 1, 3 and 3A, a second, guide collar 44 is of generally cylindrical configuration and has a reduced diameter end portion 45 at its outside end. At its opposite, inside end guide collar 44 has an inside face 48 in which is formed a guide track 46 of generally rectangular cross section. Inside face 48 faces the face 20 of drive collar 14. As shown in FIGS. 3 and 3A, guide track 46 has a pair of opposite sidewalls 50, 50' and a floor 52 extending therebetween.

A slideway 54 comprises a generally rectangular shaped slot cut into sidewall 50 and extending parallel to guide track 46 for a major central portion thereof. Slideway 54 terminates short of the respective opposite ends of guide track 46 in opposite end walls 56, 56'.

An adjusting screw passage 58 (best seen in FIG. 6A) is formed in guide collar 44 and extends from the outer surface thereof parallel to guide track 46 and through end wall 56 to communicate with slideway 54. A guide collar central bore 60 extends longitudinally through guide collar 44 and is dimensioned to snugly but slideably receive therein collar seat 26 of arbor 18 of drive collar 14.

A locking screw threaded passage 62 extends radially through guide collar 44 parallel to guide track 46, the longitudinal axis of threaded passage 62 lying in the same plane as a radius line of the cylindrical shaped collar 44 so that locking screw threaded passage 62 is aligned with locking depression 42.

Figure 6A:
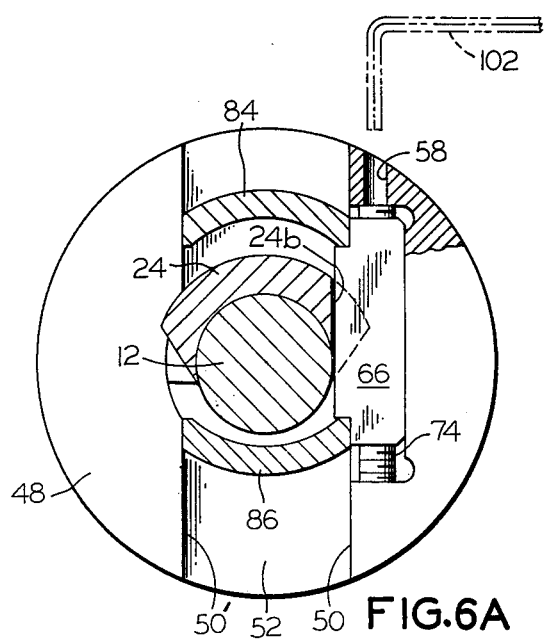
FIG. 6A is a section view with parts broken away taken along line VI—VI of FIG. 6 and showing in phantom outline a wrench tool adjacent the part.
Figure 6B:
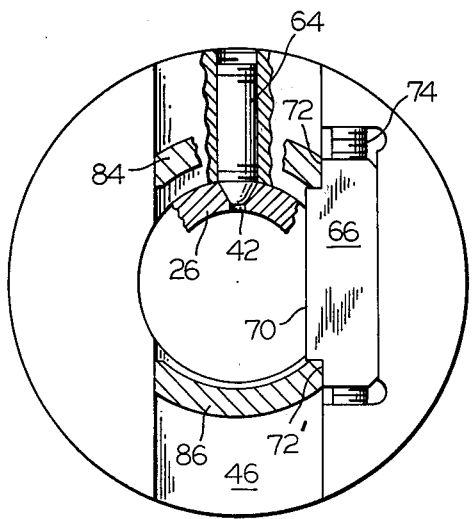
FIG. 6B is a view corresponding to that of FIG. 6A but with the locking slide 66 and other parts shown in relatively different positions from those of FIG. 6A and with other parts broken away.

A locking screw 64 has a hexagonal formation formed in its upper end adapted to receive an allen wrench or similar tool, and has a conical shaped lower end adapted to seat within locking depression 42 as shown in FIG. 6B to lock guide collar 44 non-rotatably upon collar seat 26 of arbor 16.

Referring jointly to FIGS. 1, 6A and 6B, a locking slide 66 has a threaded passage 68 extending completely therethrough so that it is open at both ends thereof. A positioning boss 70 is provided by a raised land portion formed by recesses 72, 72' at opposite ends of locking slide 66. A threaded adjusting screw 74 has a hexagonal or other suitably shaped formation formed at its upper end to receive an allen wrench or the like and is adapted to be threadably engaged with threaded passage 68 of locking slide 66, as seen in FIGS. 6A and 6B. The length of adjusting screw 74 is approximately equal to the distance between opposite end walls 56, 56'. Locking slide 66, as best seen in FIGS. 6A and 6B, has a length which is shorter than the distance between opposite end walls 56, 56' so that locking slide 66 is free to travel by rotation of adjusting screw 74, along slideway 54.

Figure 5:
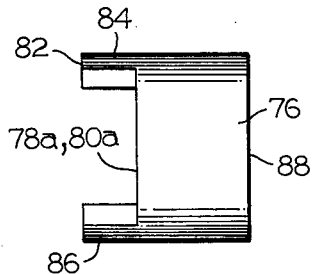
FIG. 5 is a side view in elevation of the hub member component of the assembly of FIG. 1.

A hub member 76 is of generally tubular construction, comprising a hollow cylinder having a longitudinally extending outer surface. As seen with reference to FIGS. 1, 5 and 5A, hub member 76 has a pair of oppositely disposed slots 78, 80 extending from its guide collar end 82 axially inwardly thereof and terminating in recessed shoulder portions 78a, 80a. Slots 78, 80 thereby define a pair of oppositely disposed fingers 84, 86 of arcuate configuration, each finger being formed by a segment of the wall of the cylinder comprising hub member 76. Fingers 84, 86 each extend circumferentially for somewhat less than one-quarter of the circumference of the cylinder comprising member 76. Shoulders 78a, 80a correspondingly extend for slightly more than one-quarter of the circumference.

Hub members 76 is seen to have a longitudinal axis extending generally parallel to the longitudinal axis of shaft 12.

Figure 5A:
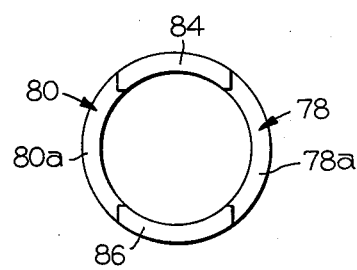
FIG. 5A is a top view of the hub member of FIG. 5.

As best seen in FIGS. 5A and 6A, the longitudinally extending edges of fingers 84 and 86 are substantially L-shaped in cross section. The longitudinally extending edges of fingers 84, 86 are formed along opposite parallel planes disposed parallel to the longitudinal axis of hub member 76. The L-shaped cross section is provided by cutting the radially inner portions of the longitudinally extending edges along parallel planes disposed perpendicularly of the first mentioned parallel planes. In this manner, longitudinally extending oppositely disposed edges of fingers 84, 86 are adapted to receive in locking engagement the opposite ends of positioning boss 70 formed by recesses 72, 72' as illustrated in FIGS. 6A and 6B. The opposite or drive collar end 88 of hub member 76 is, as best seen in FIG. 1, of annular shape.

A throw link 90 is also of substantially tubular, i.e., hollow cylindrical construction, providing a cylindrical body portion 92 having an integral throw arm 94 projecting outwardly therefrom. Throw arm 94 has a cylindrical shaped connector hole 96 formed at the distal end thereof and adapted to connect throw link 90 at any suitable member.

Figure 4:
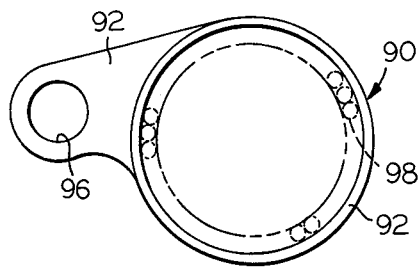
FIG. 4 is an end view in elevation of the eccentric throw link component of FIG. 1.
Figure 4A:
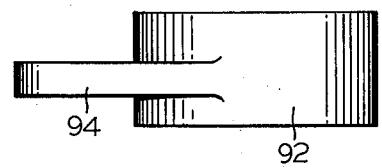
FIG. 4A is an end view of the link of FIG. 4.

In FIG. 4, (and FIGS. 6C and 6D) suitable pin bearings in a suitable track are indicated at 98. Bearings 98 may be pin roller bearings mounted within body portion 92 to reduce bearing friction between throw link 90 and the outer bearing surface of hub member 76.

FIG. 6 shows adjustable eccentric assembly 10 in its assembled condition upon rotatable shaft 12. Drive collar 14 is mounted upon shaft 12, the latter passing through bore 28 thereof. Clamping segment 16a is fastened to mounting portion 16 of collar 14 and shaft 12 is clamped securely therebetween by tightening bolts 34. Guide collar 44 is seated upon collar seat 26 of arbor 18 and is non-rotatably locked thereon by locking screw 64, which is threaded through threaded passage 62. The lowermost cone shaped portion of locking screw 64 engages locking depression 42 in collar seat 26 and is seated therein. Hub member 76 is mounted between drive collar 14 and guide collar 44, shaft 12 and arbor 18 being received within hub member 76. An eccentric throw link 90 is mounted upon hub member 76, bearing members 98 providing for reduction of friction for rotation of hub member 76 relative to throw link 90.

A pair of bearing washers 100, 100' are provided. Washer 100 is interposed between one end of body 92 of throw link 90 and annular face 20 and washer 100' is interposed between the other end of body 92 and face 48 of collar 44.

Fingers 84, 86 of member 76 extend into guide track 46 so that recessed shoulder 78a bears against inside face 48 of guide collar 44. Locking slide 66 is disposed within slideway 54 and is slidable therein by rotation of adjusting screw 74. Rotation of adjusting screw 74 is accomplished by an allen wrench (shown in dot-dash outline in FIG. 6A) or other equivalent tool adapted to be passed through adjusting screw passage 58 to engage adjusting screw 74 for rotation thereof. Notch 24b in bridge portion 24 of arbor 16 provides clearance for locking slide 66.

It is seen that bolts 34 and set screw 40 cooperate to lock drive collar 14 firmly and non-rotatably to rotatable shaft 12. Guide collar 44 is firmly and non-rotatably affixed to drive collar 14 by means of locking screw 64 securing it non-rotatably to collar seat 26 of arbor 18 by means of the engagement of locking screw 64 with locking depression 42 thereof. Hub member 76 has its drive collar end 88 firmly but slidably seated against annular shoulder 20 of drive collar 14. The opposite guide collar end 82 of hub member 76 is, by virtue of its engagement (a) within drive track 46 and, (b) by locking slide 66, firmly but slidably mounted on guide collar 44.

Referring to FIGS. 6A and 6B, it is seen that by rotation of adjusting screw 74 locking slide 66 may be made to slide, in either direction, upwardly or downwardly as viewed in FIGS. 6A and 6B, within slideway 54. In FIG. 6A, locking slide 66 is seen to be closer to end wall 56 (see FIG. 3), i.e., the upper end wall as viewed in FIG. 6A, than it is in FIG. 5, having been moved by rotation of adjusting screw 74. As screw 74 is rotated, adjusting slide 66 travels longitudinally therealong, screw 74 being "trapped" within slideway 54. Since locking slide 66 is engaged with hub member 76, sliding movement of locking slide 66 correspondingly slides or shifts hub member 76 radially relative to shaft 12, maintaining the longitudinal axis of hub member 76 parallel to the axis of rotation of shaft 12. As will be appreciated by reference to FIGS. 6A and 6B concurrently with FIGS. 6C and 6D, sliding movement of locking slide 66 shifts hub member 76 relative to shaft 12 to adjust the eccentricity of hub member 76 about shaft 12.

Hub member 76 may thus be moved selectively between two extreme points of maximum opposite eccentricity, the two points corresponding to locking slide 76 being, respectively, in its uppermost position and its lowermost position as viewed in FIGS. 6A and 6B. Adjusting screw 77 permits such adjustment in infinitesimally small increments. The maximum degree of travel of locking slide 66 is limited by the abutment of its opposite end with, respectively, end walls 56 and 56'. Adjustment from one eccentricity to the other moves hub member 76 through a position of zero eccentricity in which hub member 76 is disposed concentrically about shaft 12, i.e., the longitudinal axis of hub member 76 is coaxial with the axis of rotation of shaft 12. It will be apparent that any desired degree of eccentricity between the maximum opposite eccentricities and including zero eccentricity may be readily selected simply by rotating adjusting screw 74 the desired amount.

The relative rotational position of adjustable eccentric assembly 10 about shaft 12 may be selected by positioning assembly 12 in a selected rotational position relative to shaft 12 prior to final tightening of bolts 34 and set screw 40. This permits selection of the eccentric throw as well as its magnitude. Timing and degree or magnitude of eccentricity may be set independently of each other as is apparent from the foregoing description.

FIGS. 6C and 6D illustrate two different positions of hub member 76 relative to shaft 12. It will be appreciated that shaft 12 rotates collars 14 and 44 about a common axis of rotation. Since, in the illustrated embodiment, collars 14 and 44 are concentrically disposed about shaft 12, their common axis of rotation coincides with that of shaft 12. Hub member 76 also rotates. These members rotate relative to throw link 90. Depending on the degree of eccentricity of hub member 76 relative to collars 14 and 44 (and shaft 12), a reciprocating motion is imparted to throw arms 94 as indicated by the double ended arrows in FIGS. 6C and 6D. If throw link 90 were eliminated, the outer surface of hub member 76 could be used to provide a camming action by virtue of its eccentric rotation.

It will be appreciated that an adjustable eccentric in accordance with the invention has general applicability, whether hub member 78 or its equivalent is employed as an eccentric cam, or whether throw link 90 or its equivalent is included to serve as an eccentric linkage or the like.

The assembly of the invention is of simple and rugged construction. Relative rotational movement of parts to adjust eccentricity is not required. Therefore, radial shifting accomplishes adjustment of eccentricity without changing the timing of eccentricity relative to shaft rotation. Alternatively, rotational timing may be adjusted without changing the degree of eccentricity. Obviously, both can be changed if desired.

Upon a reading and understanding of the foregoing description, possible modifications to the specific embodiment illustrated may occur to those skilled in the art, which modification may still be within the scope of the invention and the appended claims.

What is claimed is:

1. In an adjustable eccentric assembly, the combination comprising:
    a. first collar means having mounting means adapted to non-rotatably mount said first collar means to a rotatable member for rotation therewith about an axis of rotation, and a first guide surface extending perpendicularly of the axis of rotation;
    b. second collar means having mounting means adapted to non-rotatably mount said second collar means to the associated rotatable member for rotation with said first collar means about the axis of rotation, said second collar means having a second guide surface extending parallel to said first guide surface and being spaced apart therefrom along the common axis of rotation;
    c. a hub member non-rotatably supported between said first and second collar means for rotation therewith, said hub member having a longitudinal axis disposed parallel to the common axis of rotation and opposite ends extending perpendicularly of its longitudinal axis and slidably seated on, respectively, said first and second guide surfaces, and an axially extending interior passageway; and
    d. adjusting means operatively connected to said hub member and at least one of said collar means for radially moving said hub member along said guide surfaces to any one of selected positions relative to said collar means to displace the longitudinal axis of said hub member radially relative to the common axis of rotation of said collar means whereby to adjust the eccentricity of rotation of said hub member about the common axis of rotation, said hub member being guided by said guide surfaces to maintain the longitudinal axis of said hub member parallel to the common axis of rotation and said interior passageway of said hub member being sized and configured to provide clearance for such radial displacement of said hub member.

2. The assembly of claim 1 wherein said hub member has a longitudinally extending cylindrical outer bearing surface, and further including a throw member mounted on said bearing surface for rotation of said hub member relative to said throw member, said throw member including a throw link projecting outwardly therefrom transversely of the common axis of rotation.

3. The assembly of claim 1 wherein said first and second collar means each has an axially extending opening therein, said axially extending openings are axially aligned with said axially extending interior passageway of said hub member and each of said openings and interior passageway is adapted to receive the associated rotatable member therein.

4. The assembly of claim 1 wherein said first and second collar means are adapted to be initially rotatable about the associated member and said mounting means includes locking means adapted to non-rotatably lock said first and second collar means in a selected rotational orientation relative to the associated rotatable member.

5. The assembly of claim 1 further including an arbor received within and extending axially through said hub member interior passageway between said first and second collar means, said arbor being non-rotatably affixed to each of said first and second collar means for rotation therewith and being adapted to be seated upon the associated non-rotatable member.

6. The assembly of claim 5 wherein said arbor is affixed at one end thereof to said first collar means and has a collar seating member at its opposite end, said second collar means being non-rotatably seated on said collar seating means.

7. The assembly of claim 1 further including a guide track formed in at least one of said guide surfaces and adapted to receive one end of said hub member therein, said guide track extending perpendicularly of the common axis of rotation.

8. The assembly of claim 7 further including adjusting means disposed in said second collar means adjacent said guide track, said adjusting means including an engagement element thereon adapted to engage said hub member and displacement means adapted to move said engagement element and thereby displace said hub member radially relative to the common axis of rotation.

9. The assembly of claim 1 wherein said first collar means has a generally cylindrical mounting portion having a first collar bore extending axially therethrough parallel to the common axis of rotation and further includes an arbor adapted to be seated upon the associated rotatable shaft and extending axially outwardly of said first guide surface and terminating in a collar seat, said second collar means has a generally cylindrical configuration and has a second collar bore extending axially therethrough parallel to the common axis of rotation, said second collar bore being axially aligned with said first collar bore and being adapted to be non-rotatably seated upon said collar seat, and said first and second collar bores being adapted to receive the associated shaft member therein.

10. The assembly of claim 9 wherein said second guide surface has a guide track formed therein extending perpendicularly of the axes of said first and second collar bores and the end of said hub member adjacent said second collar means terminates in at least one finger element received within said guide track.

11. The assembly of claim 1 further including a rotatable shaft comprising the associated rotatable member.

12. In an adjustable eccentric assembly, the combination comprising:
 a. first collar means having a bore extending axially therethrough, a mounting portion adapted to mount said first collar means to a rotatable shaft member for rotation therewith about an axis of rotation, a first guide surface extending perpendicularly of the axis of rotation, and locking means adapted to lock said first collar means non-rotatably to the associated rotatable shaft member;
 b. an arbor extending axially outwardly from said first guide surface of said first collar means and adapted to be seated upon the associated rotatable shaft member, and terminating in a collar seat;
 c. second collar means having a bore extending axially therethrough and adapted to be seated upon the collar seat of said arbor, and mounting means adapted to non-rotatably mount said second collar means on said collar seat for rotation with said first collar means about the axis of rotation, said second collar means having a second guide surface extending parallel to and facing said first guide surface and being spaced apart therefrom along the common axis of rotation;
 d. a hub member having a longitudinally extending cylindrical outer bearing surface and being non-rotatably supported between said first and second collar means for rotation therewith, said hub member having a longitudinal axis disposed parallel to the common axis of rotation and opposite ends extending perpendicularly of its longitudinal axis and slidably seated on, respectively, said first and second guide surfaces, and an axially extending interior passageway, both said bores and said interior passageway being axially aligned and adapted to receive the associated rotatable shaft member therethrough; and
 e. adjusting means operatively connected to said hub member and at least one of said collar means for radially moving said hub member along said guide surfaces to any one of selected positions relative to said collar means to displace the longitudinal axis of said hub member radially relative to the common axis of rotation of said collar means whereby to adjust the eccentricity of rotation of said hub member about the common axis of rotation, said hub member being guided by said guide surfaces to maintain the longitudinal axis of said hub member parallel to the common axis of rotation and said interior passageway of said hub member being sized and configured to provide clearance for such radial displacement of said hub member.

13. The combination of claim 12 further including a throw member mounted on said bearing surface of said hub member for rotation of said hub member relative to said throw member, said throw member including a throw link projecting outwardly therefrom transversely of the common axis of rotation.

14. The combination of claim 12 further including a guide track formed in said second guide surface and extending perpendicularly of said axis of rotation, said guide track slidably receiving one end of said hub member therein, and a slideway formed in said second guide surface adjacent said guide track, said adjusting means being disposed within said slideway and including a locking slide dimensioned and configured for sliding movement within said slideway, an engagement element on said locking slide adapted to engage said hub member and displacement means engaging said locking slide to move it and thereby displace said hub member radially relative to the common axis of rotation.

15. The combination of claim 14 wherein said displacement means comprises an adjusting screw threadably engaged with said locking slide whereby rotation of said adjusting screw slides said locking slide within said slideway, and said second collar means includes an adjusting screw passage extending therethrough in communication with said slideway to provide access for engagement of a tool with said adjusting screw for rotation thereof.

16. The combination of claim 14 further including a rotatable shaft comprising the associated shaft member, said bores being dimensioned and configured to receive said shaft therethrough and said interior passageway of said hub member being radially larger than said shaft to provide sufficient clearance between said shaft and said hub member for said radial displacement of the latter.

17. The combination of claim 16 wherein said first collar is initially rotatable about said shaft, and said locking means are adapted to lock said first collar in a selected rotational orientation to said shaft.

* * * * *